Feb. 13, 1962 S. ANDREWS ETAL 3,020,878
APPARATUS FOR STENCILLING PIPE
Filed Jan. 28, 1959 7 Sheets-Sheet 1
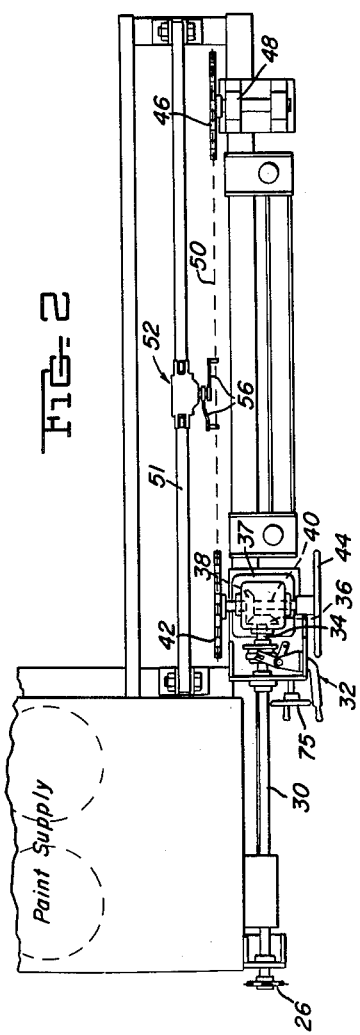
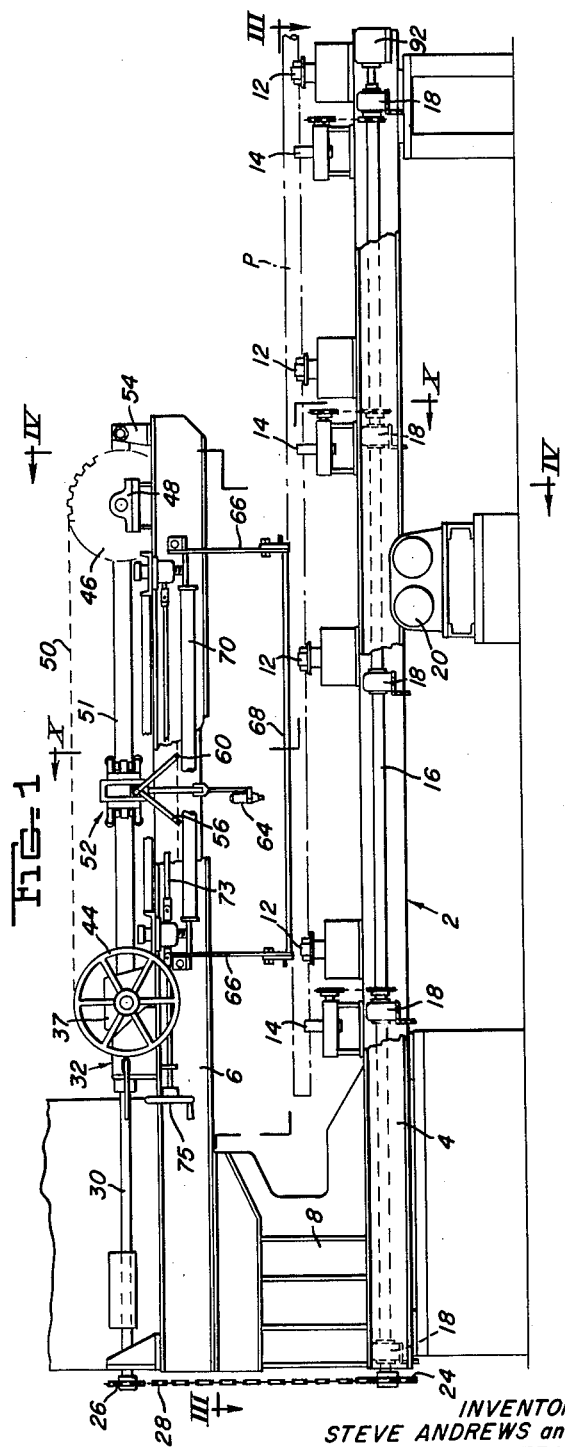
INVENTORS
STEVE ANDREWS and
FRANK C. SPRAITZAR
By Donald G. Dalton
Attorney Feb. 13, 1962 S. ANDREWS ETAL 3,020,878
APPARATUS FOR STENCILLING PIPE
Filed Jan. 28, 1959 7 Sheets-Sheet 2
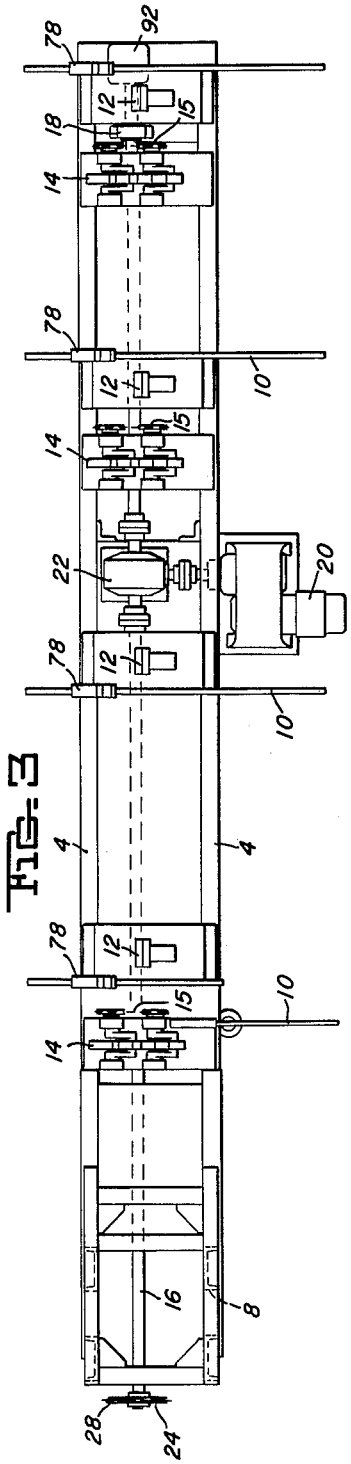
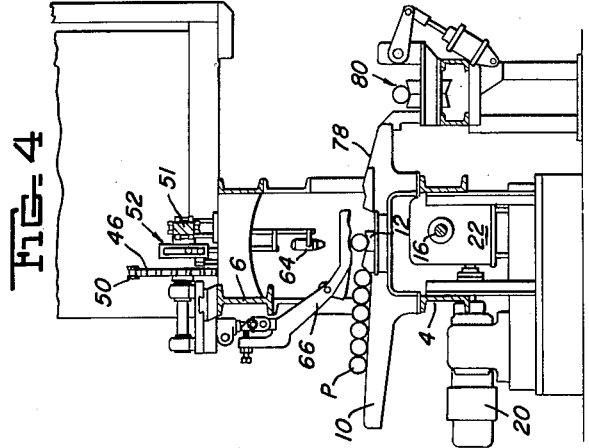
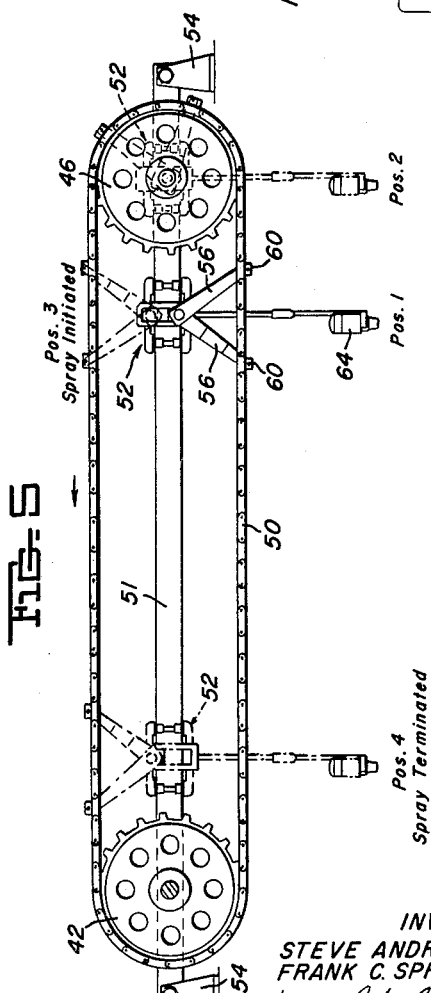
INVENTORS
STEVE ANDREWS and
FRANK C. SPRAITZAR
By *Donald G. Dalton*
Attorney

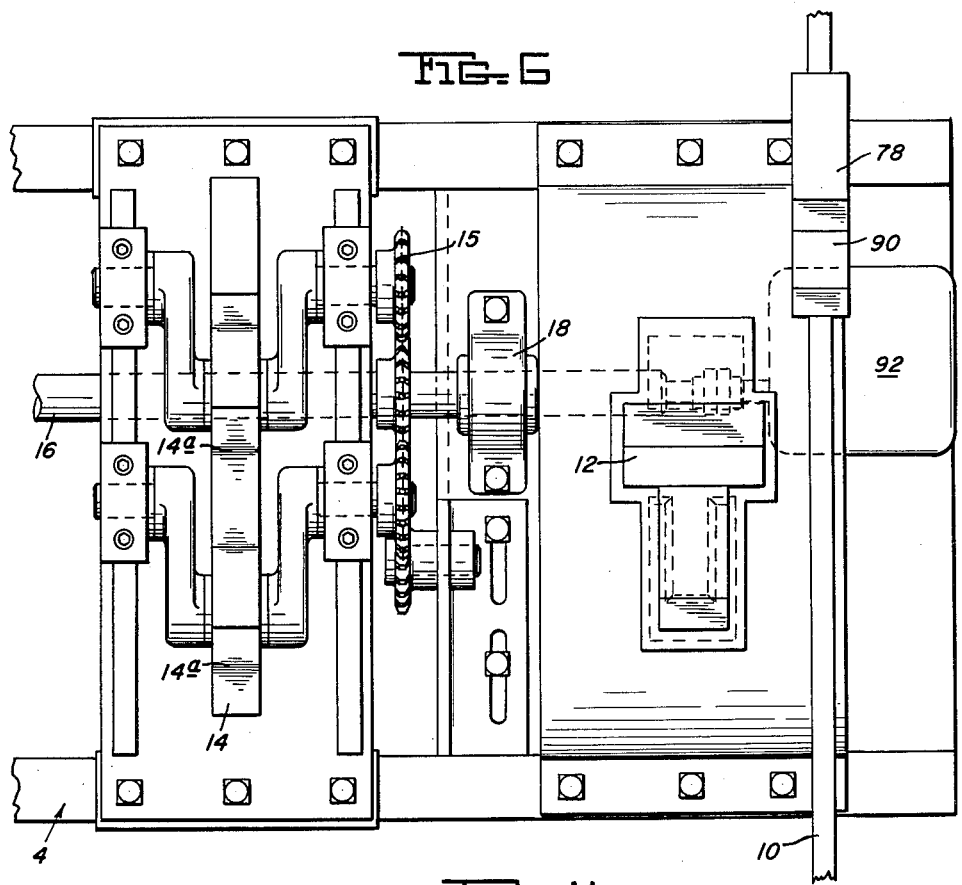
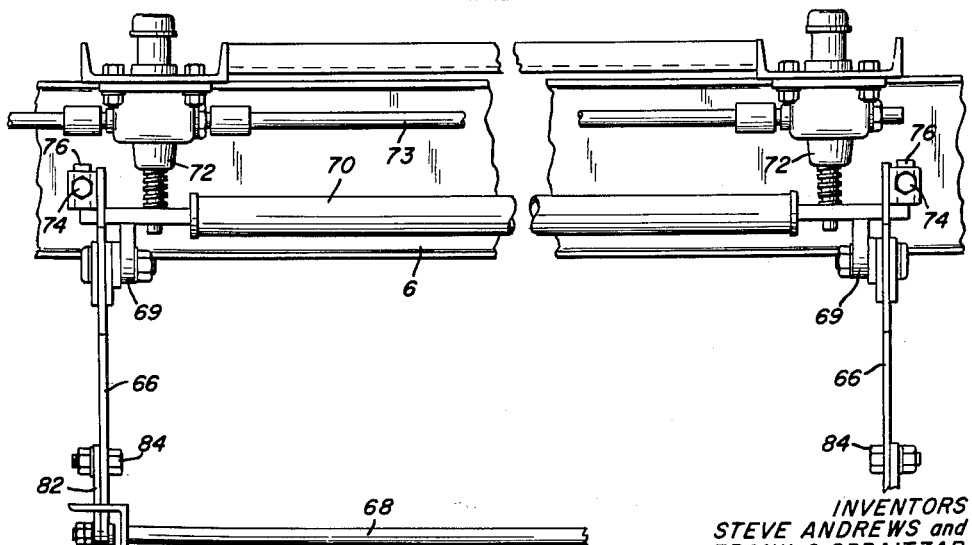

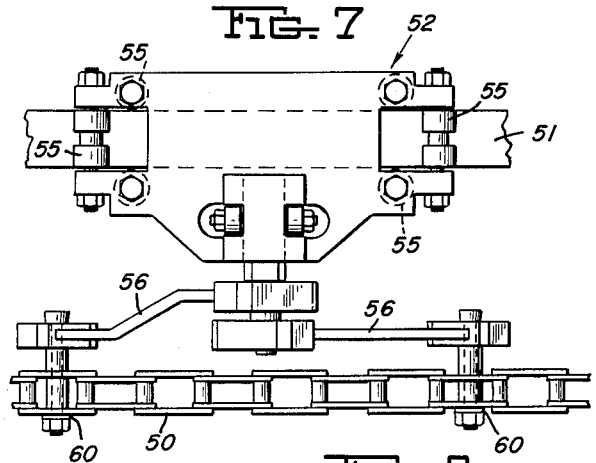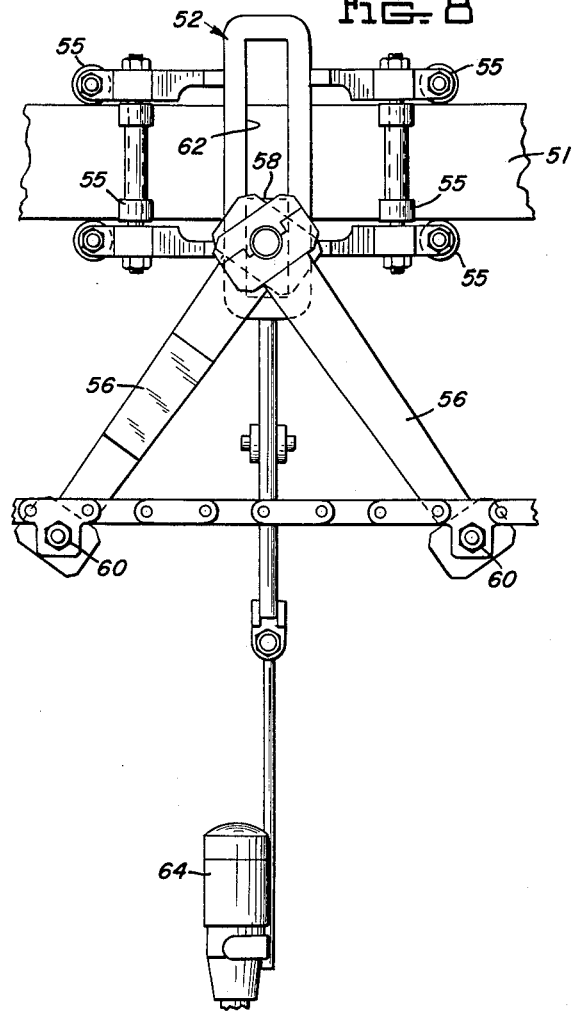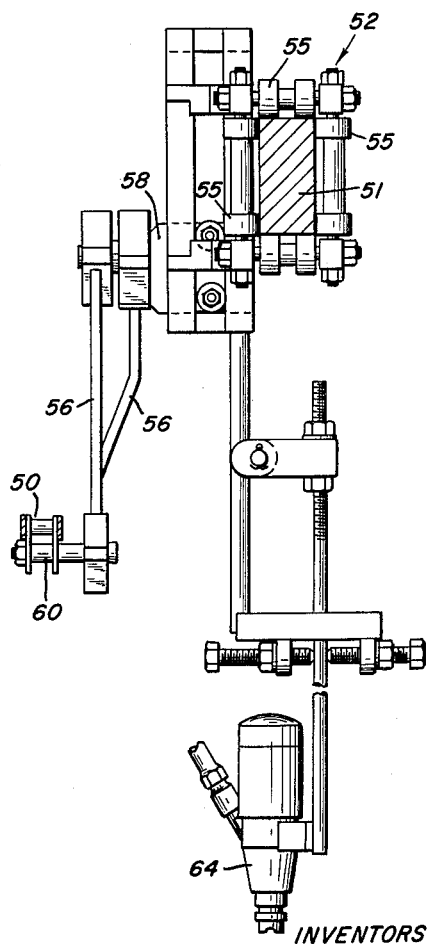

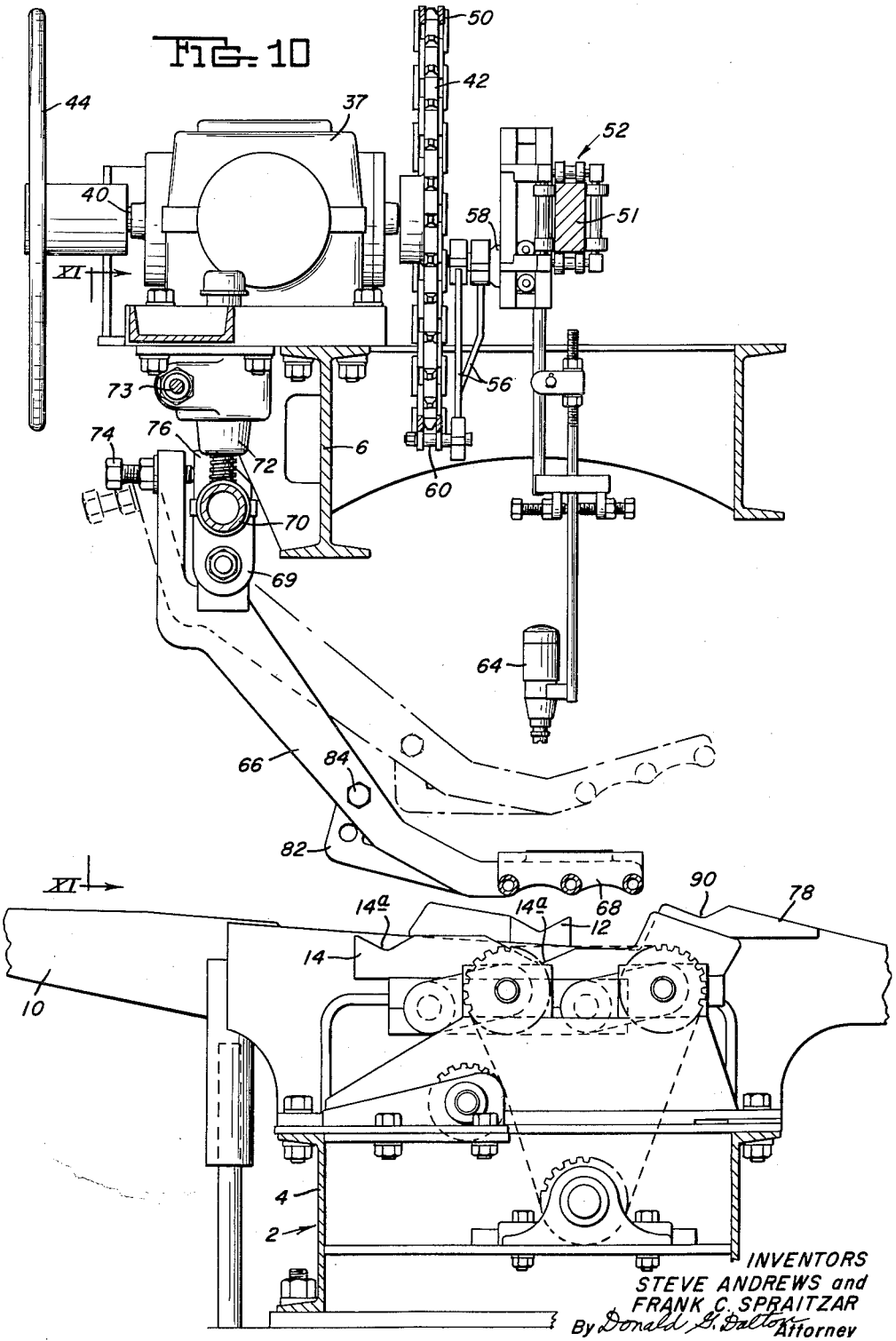

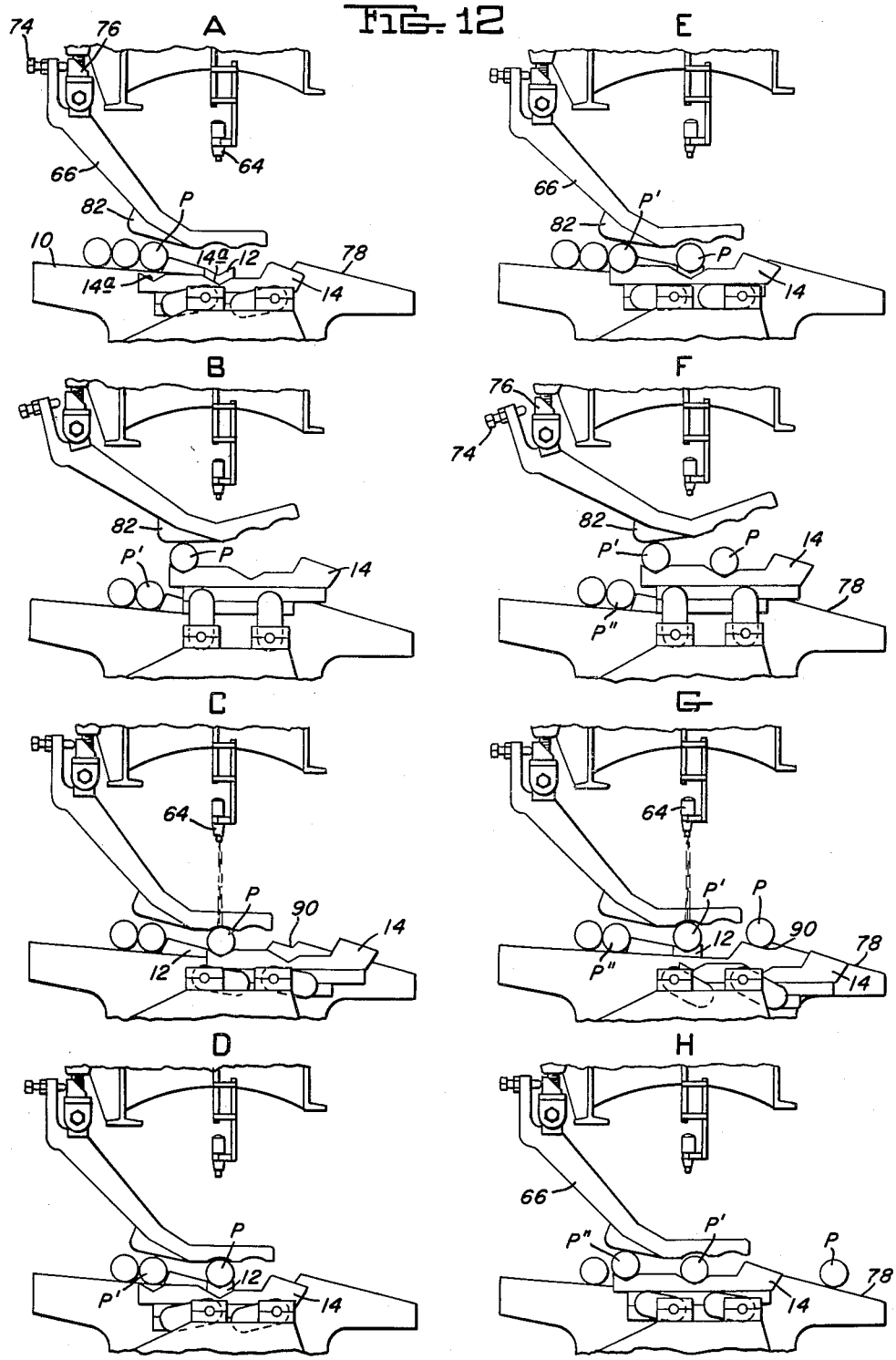

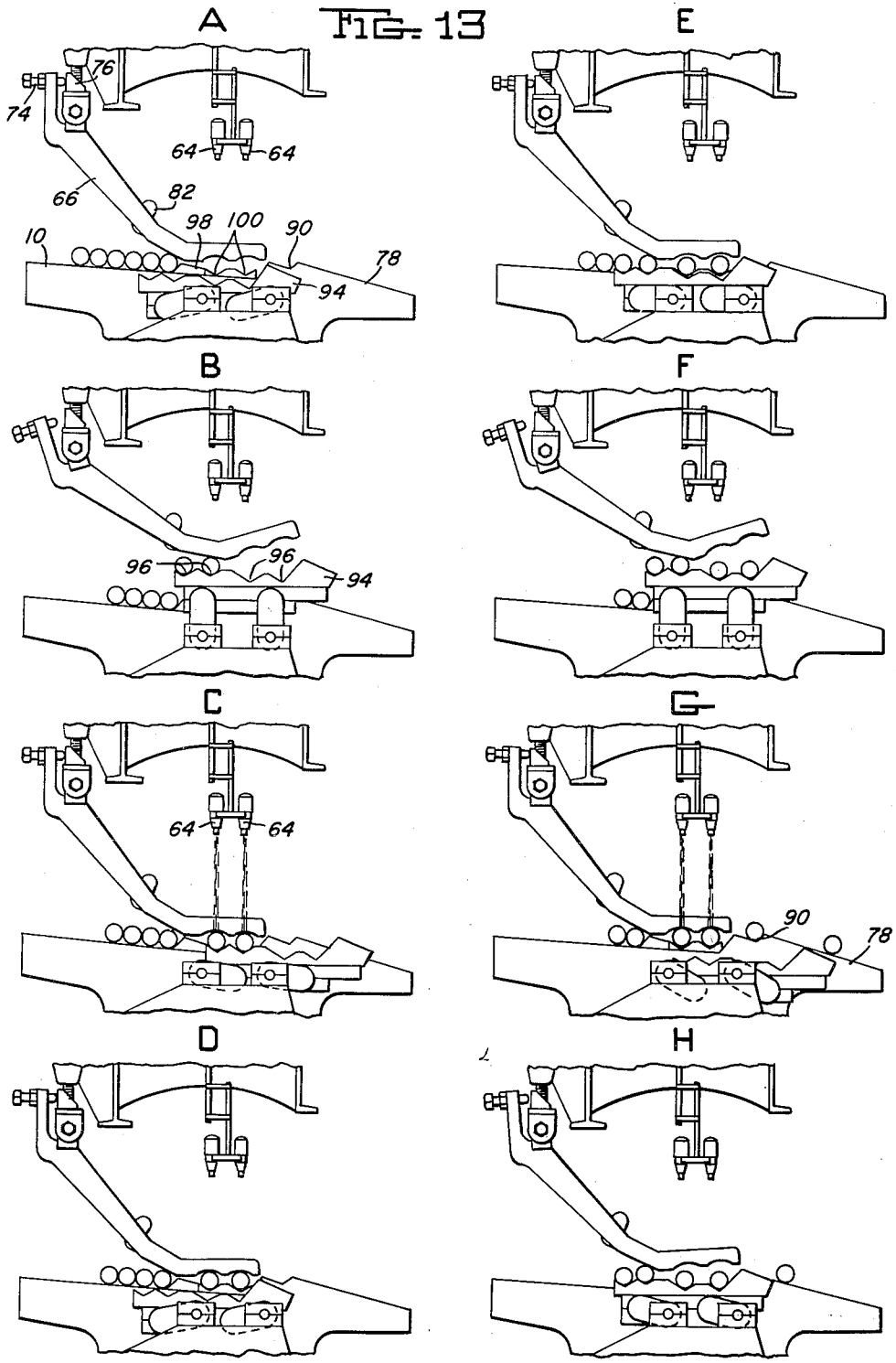

3,020,878
APPARATUS FOR STENCILLING PIPE
Steve Andrews, Fairless Hills, and Frank C. Spraitzar, Lower Makefield Township, Bucks County, Pa., assignors to United States Steel Corporation, a corporation of New Jersey
Filed Jan. 28, 1959, Ser. No. 789,634
2 Claims. (Cl. 118—301)

The present invention relates generally to apparatus for marking articles and more particularly to apparatus especially suitable for stenciling identifying marks on elongated articles such as lengths of pipe and the like.

A primary object of the invention is to provide an improved stenciling apparatus for applying painted markings on elongated articles which is especially adapted to be installed in a processing line to receive sidewise-advancing elongated articles for marking.

Another object of the invention is to provide an improved stenciling apparatus for elongated articles which includes a novel stencil-carrying frame movable by the sidewise-advancing movement of the elongated articles to permit the articles to be deposited in stenciling position under the stencil-carrying frame.

A further object of the invention is to provide an improved stenciling apparatus as set forth in the above object which includes a carriage mounted for reciprocable movement above and lengthwise of the stencil-carrying frame and a spray gun carried by the carriage for applying marking fluid onto the stencil.

Another object of the invention is to provide an improved stenciling apparatus for marking elongated articles in which the stenciling elements are readily adjustable to accommodate elongated articles of varying size.

These and other objects will become more apparent after referring to the following specification and attached drawings, in which:

FIGURE 1 is a front elevational view;
FIGURE 2 is a plan view;
FIGURE 3 is a longitudinal sectional view taken along the line III—III of FIGURE 1;
FIGURE 4 is a vertaical sectional view taken along the line IV—IV of FIGURE 1;
FIGURE 5 is an enlarged detail elevational view showing the arrangement of the spray gun carriage of the invention and its operating means;
FIGURE 6 is an enlarged detail plan view of a walking beam and V-block of the apparatus of the invention;
FIGURE 7 is an enlarged detail plan view of the spray gun carriage of the invention;
FIGURE 8 is a front elevational view of FIGURE 7;
FIGURE 9 is an end view looking at the right end of FIGURE 8;
FIGURE 10 is a vertical sectional view taken along the line X—X of FIGURE 1;
FIGURE 11 is a front elevational view taken along the line XI—XI of FIGURE 10;
FIGURE 12 is a series of schematic views similar to FIGURE 10 showing the sequence of operation of the apparatus of the invention in stenciling relatively large diameter pipe; and
FIGURE 13 is similar to FIGURE 12 but shows the sequence of operation of the apparatus of the invention in stenciling relatively small diameter pipe.

Referring more particularly to the drawings reference numeral 2 designates, generally, the supporting frame of the apparatus of the invention. The frame 2 may be substantially C shape in form having a lower arm 4 and upper arm 6 in spaced parallel relation. The lower arm 4 projects from a vertical member 8 which also supports the upper arm 6 at one end. If desired, the upper arm 6 can be supported above the lower arm 4 at both ends instead of projecting from the vertical member 8 in cantilever fashion as shown. However, the generally C shape form of the frame is preferable since it renders the apparatus capable of accommodating varying lengths of pipe.

A sloping gravity feed skid 10 is located adjacent one side of the lower arm 4. Lengths of pipe P travel sidewise on the skid 10 to the lower arm 4. A plurality of V-blocks 12 are spaced along the length of the lower arm 4 for receiving the lengths of pipe P which are carried from the skid 10 and deposited onto the V-blocks by means of spaced walking beams 14 journaled in the lower arm 4. Seats 14a are provided in beams 14 for receiving the pipe P. The walking beams, which are conventional in structure and function, are connected with and driven through drive chains 15 by a power drive shaft 16 disposed below the lower arm 4 journaled in bearings 18. Rotation of drive shaft 16 causes walking beams 14 to gyrate in a circular orbit or path, as shown in FIGURES 12 and 13. The shaft 16 is driven by a motor 20 through a gear reducer 22.

One end of the shaft 16 projects beyond the end of lower arm 4 and has keyed thereon a sprocket 24 which is connected with a sprocket 26 spaced thereabove by means of an endless chain 28. Sprocket 26 is keyed on the end of a shaft 30 which is journaled on the upper arm 6 of frame 2. The end of the shaft 30 remote from the sprocket 26 is provided with a clutch 32 for selectively engaging a clutch coupling on the stub shaft 34 of a bevel gear 36. Bevel gear 36 is contained in a gear box 37 and is disposed normal to and in mesh with a second bevel gear 38 which is also contained in the gear box 37. Bevel gear 38 is keyed on a shaft 40 which projects from opposite sides of the gear box. A sprocket wheel 42 is keyed on one projecting end of shaft 40 and a handwheel 44 is keyed on its opposite projecting end. A sprocket wheel 46 disposed in the same horizontal plane as sprocket wheel 42, is journaled in bearings 48 on the upper arm 6 of frame 2 spaced from and aligned with the sprocket wheel 42. Sprocket wheels 42 and 46 are connected together by means of a continuous chain 50, which is trained around the sprocket wheels.

A guide bar 51 which extends normal to the axes of rotation of sprocket wheels 42 and 46 is mounted on vertical plates 54 which project upwardly from the upper arm 6. A carriage 52 is mounted on the guide bar 51 by means of rollers 55 for reciprocable movement therealong between the axes of the sprocket wheels 42 and 46.

The carriage 52 is attached to the chain 50 by means of two angularly disposed links 56 which extend from a common pivotal connection with a slide plate 58 on the carriage 52 to spaced rigid connections 60 on the chain. The slide plate 58 is free to move vertically in a slot 62 on the carriage 52 for a purpose which will become apparent.

A spray gun 64 is suspended from the underside of the carriage 52. Spray gun 64 is conventional in structure and function and is provided with conventional flexible supply lines (not shown) for conducting fluid marking paint and air to the gun.

A stencil-carrying frame, which includes a pair of spaced angular supporting arms 66 and an open bottom stencil tray 68 carried by and extending between the arms, is pivotally mounted on the underside of the upper arm 6 and depends therefrom toward the lower arm 4. The supporting arms 66 are pivotally mounted on plates 69 which depend from a common shaft 70 which is rotatably supported on and extends parallel with the upper arm 6, as best shown in FIGURE 11. The shaft 70 is mounted on the upper arm 6 by means of a pair of worm and worm gear jacks 72 whereby the shaft can be raised and lowered to adjust the level of the stencil tray 68 relative to the top surface of the lower arm 4. An operating rod 73, rotatable by means of a handwheel 75 keyed to one end thereof, extends through the two jacks 72 and operates them simultaneously.

The upper end of each of the supporting arms 66 is provided with an adjustable stop nut 74 which engages a projection 76 on the upper arm 6 to limit the pivotal movement of the supporting arm in one direction.

A plurality of spaced inclined guide skids 78 are provided on the lower arm 4 over which pipes are discharged from the V-blocks 12. A roller conveyor 80 may be disposed adjacent the frame 2 for receiving pipe from the guide skids 78 and delivering it to a subsequent operation.

In operation, the apparatus is made ready for stenciling by adjusting the height and pivotal movement of the stencil-carrying frame arms 66 by means of the jacks 72 and stop nuts 74. The arms 66 are adjusted in accordance with the diameters of the pipe P to be marked so that the stencil tray 68 will rest on top of a pipe lying in the V-blocks 12. A selectively positionable cam bar 82 may be provided on each of the supporting arms 66 pivotally connected by one end to the supporting arm adjacent its free end. The other end of each cam bar is provided with two holes which may be selectively matched with a hole in the supporting arm for receiving a bolt 84 which is adapted to pass through the holes and secure the cam bar on the supporting arm. In one position, as best shown in FIGURE 10, the lower edge of the cam bar projects below the lower edge of the supporting arm. In its other position, as shown in FIGURE 13, the lower edge of the cam bar lies substantially flush with the lower edge of the supporting arm. When the cam bars are in projecting position, they extend the cam or pipe-engaging surfaces of the supporting arms so that they are readily engageable by relatively large diameter pipe to lift the supporting arms a sufficient height to permit the pipe to pass thereunder and be deposited on or removed from the V-blocks.

While the apparatus is being adjusted preparatory to operation, the clutch 32 on shaft 30 remains disengaged from the clutch coupling on shaft 34 so that the carriage 52 can be adjusted along the guide bar 51 by rotation of the sprocket wheel 42 through handwheel 44.

After the supporting arms 66 have been adjusted, a cut stencil made of paper, parchment, soft metal or similar material, is placed in the tray 68 and the carriage 52 is moved along guide bar 51 by means of the hand-wheel 44 to position the spray gun 64 so that it overhangs one end of the tray 68 (indicated Pos. 1 in FIGURE 5). The clutch 32 is then moved into engagement with the clutch coupling on the bevel gear shaft 34 and the apparatus is ready for operation.

To start the stenciling operation, motor 20 is actuated to rotate drive shaft 16 and gyrate walking beams 14 to lift a pipe P from the skid 10 and deposit it in the V-blocks 12 (sequence steps A, B and C in FIGURE 12). As the walking beams advance the pipe P into the frame 2 the pipe engages the bottom portions of the supporting arms 66 to lift the stencil-carrying frame out of the way as shown in sequence step B of FIGURE 12. After the pipe has been lowered into the V-blocks the supporting arms 66 swing downward by gravity until stencil tray 68 rests upon the deposited pipe (sequence step C of FIGURE 12). The walking beams continue in their orbit forwardly and then downwardly away from the pipe after the pipe has been lowered onto the V-blocks (sequence steps C and D of FIGURE 12).

As the walking beams are advancing the pipe length P into the V-blocks, carriage 52 has been moved toward the end of the guide bar 51 (indicated Pos. 2 in FIGURE 5) and back to its starting position (indicated Pos. 3 in FIGURE 5) wherein the spray gun overhangs one end of the stencil-tray 68. This movement of the carriage is effected by travel of the link connections 60 around the sprocket wheel 46, as shown in dotted lines in FIGURE 5. After the pipe P has been deposited in the V-blocks the spray gun is actuated to spray fluid marking paint on the stencil as the carriage 52 is moved along the guide bar 51 by the chain 50. When the carriage reaches a position over the opposite end of the stencil tray (indicated Pos. 4 in FIGURE 5), the spray gun is shut off but the carriage continues to travel along the guide bar towards the end thereof adjacent sprocket wheel 42. While the carriage is thus continuing its travel, the walking beams have gyrated to a position where seats 14a lie underneath the next succeeding pipe length P' and the pipe P which has just been stenciled (sequence steps D and E of FIGURE 12). The walking beams then gyrate upwardly and forwardly to lift the next succeeding pipe length P' from the skid 10 and at the same time lift the stenciled pipe P from the V-blocks and advance the former to the V-blocks and the latter to aligned grooves 90 at the top of the guide skids 78 (sequence steps F and G of FIGURE 12). During this movement the supporting arms 66 have been lifted out of the way and the carriage 52 has moved to a position where the spray gun 64 overhangs the end of the stencil tray. The travel of the carriage being brought about by travel of link connection points 60 around sprocket wheel 42 from the upper flight of chain 50 to its lower flight. After the pipe lengths have been deposited in the V-blocks and in grooves 90, respectively, the spray gun is actuated and the carriage 52 moves along the guide bar over the stencil tray toward sprocket wheel 46. When the spray gun reaches a position overhanging the end of the stencil tray adjacent the sprocket wheel 46, the spray gun is again shut off but the carriage continues to move toward the end of the guide bar. As the carriage continues its movement the walking beams lift the next pipe P" to be stenciled from the skid 10 and the stenciled pipe P' from the V-blocks (sequence step H of FIGURE 12). As the walking beams lift pipes P" and P', pipe P is nudged out of the grooves 90 by the walking beams to impel it down the guide skids 78 to the conveyor 80 and the cam bars 82 are engaged by pipe P" to lift the arms 66 out of the path of pipes P" and P'. The walking beams continue in their orbit to advance pipes P" and P' and lower them into the V-blocks 12 and grooves 90, respectively. The sequence of operations just described is repeated during continued operation of the apparatus.

A rotating-cam limit switch 92 driven by the power shaft 16 may be provided to actuate and de-actuate the spray gun automatically.

It will be noted that all moving parts of the apparatus of the invention are powered by one drive unit through an arrangement of gears, sprockets and chains, as described above, thus insuring full synchronization of movement at all times.

The walking beams of the apparatus are continuously in motion and the sprockets 42 and 46 and chain 50 are continuously moving during the stenciling operation. Actual stenciling takes place while the walking beams are on the lower or non-conveying portions of their orbits. The triangular linkage of the carriage 52 with the continuously moving chain 50 formed by the links 56 and their pivotal connection with the slideplate 58 on the carriage converts the continuous motion of the chain 50 into a reciprocating movement of the carriage and spray gun.

Preferably, the walking beams 14 are constructed with removable pipe seat portions and the V-blocks 12 are detachably mounted on the lower arm 4 of the frame 2 so that the apparatus can be readily adjusted for stenciling smaller diameter pipe in pairs. For such use a pipe seat portion 94 having four pipe receiving grooves or seats 96 therein is installed on the walking beams and V-blocks 98 having double V-grooves 100 therein are installed on the lower arm 4 in place of the V-blocks 12. An additional spray gun 64 is also suspended from the carriage 52 when relatively small diameter pipe is to be processed. FIGURE 13 illustrates schematically the arrangement of the elements of the apparatus of the invention for processing smaller diameter pipe in pairs and the sequence of steps during the feeding, stenciling and discharging stages of the operation for smaller diameter pipe.

It will be noted in FIGURE 13 that the position of the cam bar 82 on the supporting arm has been changed so that it no longer projects below the edge of the arm.

In stenciling smaller diameter pipe, as shown in FIGURE 13, the sequence of steps is the same as that described above for larger diameter pipe except that the walking beams lift four lengths of pipe at one time after the first pair of pipes has been stenciled (sequence steps D, E, and F of FIGURE 13). As shown by sequence steps F, G and H of FIGURE 13, after each pair of pipes has been stenciled (after the first pair), the pipes are lifted from the V-blocks 98 by the walking beams and carried thereby to the skids 78 where one pipe of the stenciled pair is deposited in the grooves 90 and the other is discharged down skids 78. Then, as the walking beams lift the next pair of stenciled pipes from the V-blocks 98, the previously stenciled pipe is nudged out of the grooves 90 and impelled down skids 78 by the walking beams.

While one embodiment of our invention has been shown and described, it will be apparent that other adaptations and modifications may be made without departing from the scope of the following claims.

We claim:

1. Apparatus for marking elongated articles comprising means for supporting elongated articles in position to be marked, means for advancing elongated articles sidewise and depositing them on said support means, a stencil-carrying frame pivoted above said support means and extending downwardly thereto from the entrance side of the support means so as to be displaced by an elongated article as it is advanced and to lie on an elongated article resting on said support means when deposited thereon, said frame comprising a pair of spaced arms and an elongated stencil support carried by and extending between said arms, a bearing bar on each of said arms pivoted adjacent the lower end thereof and adapted to be engaged by an elongated article on said elongated article advancing means, means for securing the bearing bars in selective position relative to said arms, a guide track spaced vertically above said support, a carriage reciprocable along said track in a plane parallel with said support, and a spray gun on said carriage adapted to discharge marking fluid onto a stencil carried by said frame.

2. Apparatus for marking elongated articles comprising means for supporting elongated articles in position to be marked, means for advancing elongated articles sidewise and depositing them on said support means, a stencil-carrying frame pivoted above said support means and extending downwardly thereto from the entrance side of the support means so as to be engaged and displaced by an elongated article as it is advanced and to lie on an elongated article resting on said support means when deposited thereon, a bearing bar adjustably mounted on said frame and adapted to be engaged by an elongated article on said elongated article advancing means, means for securing the bearing bar in selective position relative to said frame, a guide track spaced vertically above said support, a carriage reciprocable along said track in a plane parallel with said support, and a spray gun on said carriage adapted to discharge marking fluid onto a stencil carried by said frame.

References Cited in the file of this patent

UNITED STATES PATENTS

| | | |
|---|---|---|
| 2,114,974 | Camerota | Apr. 19, 1938 |
| 2,228,410 | Sharma et al. | Jan. 14, 1941 |
| 2,293,881 | Bailey | Aug. 25, 1942 |
| 2,342,375 | Shurley | Feb. 22, 1944 |
| 2,346,174 | Malnar | Apr. 11, 1944 |
| 2,530,484 | Schmidt | Nov. 21, 1950 |
| 2,539,084 | Keeley et al. | Jan. 23, 1951 |
| 2,728,238 | Paasche | Dec. 27, 1955 |
| 2,763,236 | Cummings | Sept. 18, 1956 |
| 2,777,419 | Paasche | Jan. 15, 1957 |
| 2,943,562 | Phillips et al. | July 5, 1960 |

FOREIGN PATENTS

| | | |
|---|---|---|
| 837,936 | France | Nov. 28, 1938 |